(12) United States Patent  
Slotwinski et al.

(10) Patent No.: US 7,925,134 B2  
(45) Date of Patent: Apr. 12, 2011

(54) PRECISION LENGTH STANDARD FOR COHERENT LASER RADAR

(75) Inventors: Anthony Slotwinski, Woodbridge, VA (US); Andrew L. Bennett, Fredericksburg, VA (US)

(73) Assignee: Nikon Metrology NV, Leuven (BE)

( * ) Notice: Subject to any disclaimer, the term of this patent is extended or adjusted under 35 U.S.C. 154(b) by 474 days.

(21) Appl. No.: 12/164,711

(22) Filed: Jun. 30, 2008

(65) Prior Publication Data

US 2009/0323077 A1    Dec. 31, 2009

Related U.S. Application Data

(63) Continuation of application No. 11/376,351, filed on Mar. 15, 2006, now abandoned.

(60) Provisional application No. 60/662,367, filed on Mar. 17, 2005.

(51) Int. Cl.  
*G02B 6/02* (2006.01)

(52) U.S. Cl. .................. 385/128; 385/122; 385/133

(58) Field of Classification Search .................. 385/122, 385/123, 131, 133, 128; 356/482  
See application file for complete search history.

(56) References Cited

U.S. PATENT DOCUMENTS

| | | | |
|---|---|---|---|
| 4,427,263 A | 1/1984 | Lagakos et al. | |
| 4,665,363 A * | 5/1987 | Extance et al. ............ | 324/244.1 |
| 4,824,251 A | 4/1989 | Slotwinski et al. | |
| 4,830,486 A | 5/1989 | Goodwin | |
| 4,994,668 A | 2/1991 | Lagakos et al. | |
| 5,339,375 A | 8/1994 | Kerns | |
| 5,402,230 A | 3/1995 | Tian et al. | |
| 5,428,471 A | 6/1995 | McDermott | |
| 5,493,627 A | 2/1996 | Pan et al. | |
| 5,771,114 A | 6/1998 | Andersson et al. | |
| 5,945,668 A | 8/1999 | Davidson | |
| 6,317,526 B1 * | 11/2001 | Shirasaki et al. ................. | 385/3 |
| 6,726,684 B1 | 4/2004 | Woloszko | |
| 6,757,469 B2 | 6/2004 | Bauer et al. | |
| 6,778,278 B2 | 8/2004 | Ahmadvand et al. | |
| 7,139,446 B2 | 11/2006 | Slotwinski | |
| 7,139,488 B1 | 11/2006 | Mituhashi | |
| 2002/0054294 A1 * | 5/2002 | Ahmadvand et al. ......... | 356/477 |
| 2003/0113092 A1 | 6/2003 | Porter | |
| 2006/0020857 A1 | 1/2006 | Miller et al. | |
| 2007/0014692 A1 | 1/2007 | Erb et al. | |
| 2007/0021941 A1 | 1/2007 | Blemel | |
| 2007/0278434 A1 | 12/2007 | Tsuda et al. | |

FOREIGN PATENT DOCUMENTS

EP    2006738602    9/2006

(Continued)

OTHER PUBLICATIONS

WO for International Patent Application Serial # PCT/US2006/009564, Slotwinski, mailed Oct. 26, 2007.

(Continued)

*Primary Examiner* — Ellen Kim  
(74) *Attorney, Agent, or Firm* — Burns & Levinson LLP; Orlando Lopez

(57) ABSTRACT

This disclosure presents a version of a coherent laser radar system that is immune to environmental effects on Mach-Zehnder-configured interferometers and reference length standards comprising such systems. The present disclosure also describes methods and materials which alleviate interferometer drift due to vapor absorption using a polyimide coated polarization maintaining fiber to reduce the change in the length of a reference arm.

2 Claims, 5 Drawing Sheets

FOREIGN PATENT DOCUMENTS

WO PCT/US2006/009564 9/2006
WO WO/2006/102001 9/2006

OTHER PUBLICATIONS

HB-P Polarization Maintaining Fiber, Factnote 2.1.2, Fibercore Limited, Chilworth, UK, May 2004.
U.S. Appl. No. 60/662,367, Slotwinski, filed Mar. 17, 2005.
U.S. Appl. No. 11/376,351, Slotwinski, filed Mar. 15, 2006.
Non-final Office Action for U.S. Appl. No. 11/376,351, mailed Sep. 11, 2007.
Interview Summary for U.S. Appl. No. 11/376,351, mailed Dec. 27, 2007.
Final Office Action for U.S. Appl. No. 11/376,351, mailed Mar. 31, 2008.
ISR for International Patent Application Serial # PCT/US2006/009564, Slotwinski, mailed Oct. 30, 2007.

* cited by examiner

PRECISION LENGTH STANDARD FOR COHERENT LASER RADAR

CROSS REFERENCE TO RELATED APPLICATIONS

This application is a continuation patent application under 37 C.F.R. 1.53(d) of pending U.S. patent application Ser. No. 11/376,351, Art Unit 2874, Classification 385/128. This application claims priority benefit of U.S. provisional patent application Ser. No. 60/662,367 filed Mar. 17, 2005.

BACKGROUND

The present embodiment generally relates to Mach-Zehnder-configured interferometers and reference length standards in counter chirp FM laser radars. More specifically, methods and materials are described which alleviate interferometer drift due to vapor absorption observed for conventional fiber jacketing materials.

There are a number of optical systems that can measure a distance to a target. Such systems typically utilize an open beam propagated through free space between the laser source and the target. However, when the target location is such that limited free space is available for beam propagation, such systems are of limited use. Thus, well known systems may be able to perform distance measurements, but the open beam optical sensor head prevents application in limited access areas and tight places. For example, precision measurement of dimensions inside a chassis cannot easily be accomplished with such open beam systems. While it is known to transfer light through optical fibers, precision is compromised due to the environmental effects on the fiber itself. These environmental effects can change the optical path length and the polarization of the light in the fiber, adversely affecting measurement precision.

The existing art in precision FM laser radar incorporates a single chirp laser source and a polarization maintaining fiber optic geometry with separate local oscillator (LO) and signal paths (see, e.g., U.S. Pat. Nos. 4,824,251 and 4,830,486). Such laser radars most typically use a length standard of some kind as a basis for a high-precision absolute length measurement.

The existing art in length standards for these and related applications fall into two primary categories. One category involves an artifact based standard such as temperature compensated metal or glass bars/tubes with targets mounted to each end. For the range needed (2-4 m) these are unwieldy and it is impractical to integrate them into a measurement system. The second category utilizes a fiber optic based length standard, which can easily be packaged into a small volume.

In an improvement on the single chirp laser system referred to above, the inventor herein has developed a counter chirp configuration that provides a much greater insensitivity to vibration induced range errors by providing for a more accurate Doppler correction. Moreover, by combining the LO and signal paths for two lasers into a single fiber, the fiber optic circuit is both less complicated and less expensive due to fewer components and completely immune to error caused by changes in the LO and signal path lengths due to environmental factors such as temperature. This configuration is described in U.S. patent application Ser. No. 11/354,382, filed Feb. 15, 2006, the contents of which are incorporated herein by reference as though set forth in their entirety. That technology utilized reference standards either of the Mach-Zehnder type or of the Michelson type. However, that application did not disclose methods of preventing non-temperature-related drift.

Ahmadvand et al. (U.S. Pat. No. 6,778,278) disclose a method to compensate for temperature drift in a Mach-Zehnder interferometer by adding jacketing material of a specific thickness and length to one or both arms of the interferometer as a means of eliminating the need for active temperature control of the device. The result is that the two arms change the same amount with temperature changes despite the fact that they are different lengths. However, for higher channel density applications differences in path length will increase (as would the need for the temperature compensation). Moreover, they do not address other environmental causes of interferometer drift.

Bauer et al. (U.S. Pat. No. 6,757,469) disclose fabrication methods of waveguide devices that insure temperature insensitivity. These waveguide devices are not optical fibers. Again, the disclosure is limited to temperature effects not alleviation of vapor absorption effects.

Typically, the Mach-Zehnder interferometer formed by two couplers and the fiber between them is kept in a temperature-controlled container to prevent the fiber lengths from changing. If the difference in fiber lengths is calibrated, the reference interferometer can serve as an absolute length standard for the laser radar system as well as provide a signal useful in the linearization of the laser waveform.

FM lasers are largely immune to ambient light conditions and changes in surface reflectivity because FM laser radars rely only on beat frequency, which is not dependent upon signal amplitude, to calculate range. This enables the FM Coherent system to make reliable measurements with as little as one picowatt of returned laser energy. This corresponds to a nine order-of-magnitude dynamic range of sensitivity. However, these instruments are not immune to drift caused by other ambient conditions.

Ambient conditions other than temperature can affect effective optical path lengths in several ways. In particular, the presence of water vapor in the surrounding air affects the optics. In addition to water vapor, volatile components of the polymers (especially acrylate) can outgas, thereby causing a dimensional change in the jacket and thus a change in the fiber as described below.

An effective optical path length in an optical fiber can change either because of a change in the refractive index of the core of the fiber, potentially caused by absorption of impurities, or because of a physical change in diameter or length of the fiber brought about by ambient conditions. If a fiber's jacket absorbs, for example, water vapor or other impurities, the jackets dimensions change, thus exerting compressive force on the underlying glass fiber. Conversely, outgassing of water vapor or other impurities diminishes compressive force on the glass fiber. The change in force causes both the diameter and length of the fiber to change by small amounts and possibly the index of refraction to change, causing a change in effective optical path length. Since the precision being sought in the current embodiment is on the order of one part per million, it can be seen that tiny changes in dimension or optical path length can affect the precision of the instrument. The change in force can also degrade the polarization maintainability of the fiber due to stress birefringence.

What is needed is a jacketing/coating material that does not tend to absorb or outgas water vapor and other impurities which can cause an effective change in the length of the reference arm.

SUMMARY

Acrylate is the principal heritage coating or jacketing material for optical fibers. It has been designed into flight grade optical fiber for optical cable since the 1980's. The advantages of the acrylate material is that it can be selected for strippability (for example, with methylene chloride) and is fairly soft, which makes the fiber more flexible. Its disadvantages are that acrylates tend to have low temperature ratings (usually around 85° C. although some are available that are rated as high as 200° C.) and it is a well known outgasser.

During development of the embodiment disclosed in U.S. patent application Ser. No. 11/354,382, filed Feb. 15, 2006, the inventors determined that drift in the instrument was causing a loss of precision over that deemed to be achievable. Investigation and analysis showed that length variations of the acrylate-coated fiber were at fault, and it was determined that vapor absorption and outgassing of the acrylate were the root causes of optical path length variations.

Once the cause of the length variation of the acrylate coated fiber was isolated, several options were proposed. Initial attempts to limit the effect of acrylate proved ineffective, so it became necessary to test existing systems with alternate fiber coatings, specifically low melting point metal and polyimide.

The present embodiment makes use of specially coated polarization maintaining (PM) fiber to reduce the change in the length of the reference arm. In the most preferred embodiment, the coating is polyimide. An example of polyimide coated fiber available commercially is to be found at http://fibercore.com/05hb-hbp.php, "HB-P Polarization Maintaining Fiber." As can be inferred from the contents of this link, until the present embodiment, polyimide coating has been used primarily for high temperature performance, e.g., to withstand medical sterilization and high curing temperatures. What is most novel in the current embodiment is to use polyimide and other acceptable coatings to provide dimensional, optical path length, and birefringence stability in addition to high temperature performance.

However, other coatings are acceptable substitutes, Other coatings can perform the same function. Fibers are available and have been jacketed with many polymer coatings including Ultraviolet Cured (UV-cured) Acrylate, Polyimide, Teflon, DuPont Tefzel, Hytrel and Nylon. After acrylate, polyimide is probably the most readily available off-the-shelf especially in PM fiber and works well for this application. In addition, metal coated fibers can provide dimensional stability but may have higher temperature sensitivities. Fibers that function in the way described in this disclosure are referred to herein as substantially hydrophobic and substantially non-outgassing.

Polyimide has been used successfully for coating space grade optical fiber and it comes with the advantage of a 125° C. temperature rating. However, it was not an obvious choice for use in a laser metrology device because of its known disadvantages. Polyimide has exhibited some disadvantages that have made it a less than desirable first choice for coating optical fibers. For example, polyimide tends to make the fiber seem stiffer than an acrylate coated fiber. Second coatings have been added, but the known additional coatings come with their own problems that have limited the desirability of polyimide for mainstream applications. For example, such second coatings have exhibited outgassing and contamination problems. Of even more significance are the difficulties associated with stripping polyimide. Polyimide coating can be stripped chemically, with hot sulfuric acid, or mechanically, using a hot tweezers. Users find hot sulfuric acid to be dangerous and non-portable. Mechanical stripping methods are not recommended because they have the capacity to introduce surface flaws to the glass fiber, compromising long term reliability. As noted elsewhere, the realization that it offered superior vapor absorption and outgassing properties that provided improved dimensional stability led to its adoption for the current embodiment.

The coherent laser radar as it is currently envisaged requires a fiber optic reference arm interferometer in a Mach-Zehnder configuration as its reference length standard. This internal length standard is calibrated by using an external interferometer to determine the exact length differential between the two paths of the reference interferometer. In a related aspect, if this length difference varies with time there will be a corresponding scaling error in range measurements on the measurement path. In one embodiment, the present embodiment diminishes the length variation within the reference arm, allowing for long-term range accuracy without the need for frequent calibration.

The present embodiment is applicable to all non-contact precision distance measuring applications that incorporate a fiber optic length standard. The insensitivity of the polyimide coating to environmental conditions allows a system to operate for months in a changing environment and remain within specification without the need for a range calibration, effectively reducing the necessary system maintenance and extending the time between scheduled certification.

Exemplary methods and systems according to this embodiment are described in greater detail below.

DETAILED DESCRIPTION

It is also to be understood that the terminology used herein is for the purpose of describing particular embodiments only, and is not intended to limit the scope of the present embodiment. It should be further understood that as used herein and in the independent claims, the singular forms "a," "an," and "the" include plural reference unless the context clearly dictates otherwise. Thus for example, reference to "an isolator" includes a plurality of such isolators, reference to a "reference arm" is a reference to one or more arms and equivalents thereof known to those skilled in the art.

As used herein, "coherent radiation," including grammatical variations thereof, means radiation in which the phase relationship between any two points in the radiation field has a constant difference, or is exactly the same in either the spatial or the temporal mode throughout the duration of the radiation. In particular, a laser is a device which artificially generates coherent radiation in the form of light within a narrow range of wavelengths.

In order to understand the current fiber optic based length standard it is necessary to have some grounding in FM laser radar in general. In coherent, or FM laser radar that uses a diode laser as its source, the frequency of the laser is modulated directly by modulating the laser's injection current. The mode of obtaining a precise relative distance measurement in a state of the art system is spelled out in detail U.S. patent application Ser. No. 11/354,382, filed Feb. 15, 2006, the contents of which have already been incorporated by reference herein.

Advanced techniques employed in the embodiment set forth in U.S. patent application Ser. No. 11/354,382 enable a high degree of linearity in the relative distance measurements. In addition, these techniques can detect and compensate for real time variances from linearity. These features enable range measurement with a single digit micron precision. Such precision is high enough that preventing drift caused by environmental factors becomes extremely important.

Figure 1:
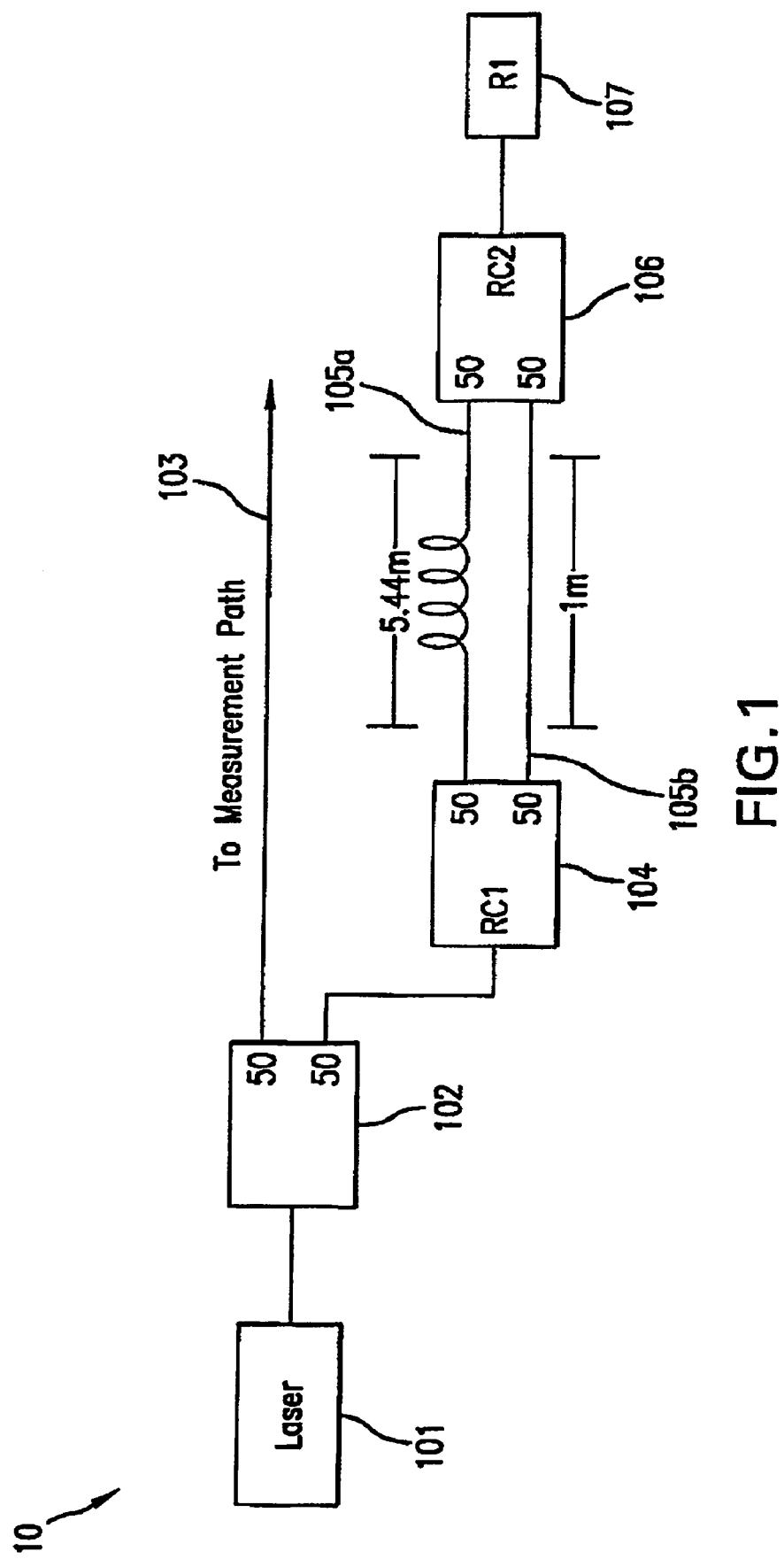
FIG. 1 shows the reference arm.

For precision measurements with an FM laser chirp system it is necessary to include a reference standard both for absolute ranging accuracy and to help linearize the laser's chirp waveform. As mentioned above, this reference standard can take the form of a fiber optic interferometer in a Mach-Zehnder configuration, 10, FIG. 1. For the internal reference standard, the light from an IR laser, 101, after passing through an isolator (not shown), is split into two fibers by means of a fiber coupler, 102. One path is used to measure range, 103. The other path is directed to the reference standard that consists of an input fiber optic coupler, RC1, 104, which splits the light into two fiber paths (105a, 105b) and an output fiber coupler, RC2, 106, which recombines the light into a single fiber. The two paths of fiber between the two couplers are mismatched in length by several meters such that a laser radar signal is detected on the detector, R1, 107.

Typically, the Mach-Zehnder interferometer formed by the two couples and the fiber between them is kept in a temperature-controlled container to prevent the fiber lengths from changing. If the difference in fiber lengths is calibrated, the reference interferometer can serve as an absolute length standard for the laser radar system as well as provide a signal useful in the linearization of the laser waveform. This difference in fiber length is typically set to an equivalent range of 4 meters in air and the laser is typically linearized to give a 2.3 MHz beat frequency over the reference arm path. Knowing that the reference length is calibrated, it is then easy to calculate the distance from the scanner to any point in space by using a scaling factor calculated by:

$$\text{Scaling (MHz/M)} = 2.3 \text{ MHz}/\Delta d \text{ Reference } (\sim 4 \text{ m}) \quad (5)$$

Typically, the single mode, polarization maintaining fiber widely available uses a UV cured acrylate coating that is hygroscopic. This coating tends to absorb or outgas water vapor and other impurities causing an effective change in the optical length of the reference arm. In many cases, this drift can be severe and rapid, resulting in a change of several hundred microns (10-100 parts per million (PPM)) in a matter of hours/days. Unlike drift in one of the LO paths which simply translates into a range offset, this change in the reference arm length has a direct effect on the range accuracy of the machine, i.e., an increase in reference arm length of 1 part per million results in an across the board range error of 1 part per million. This can be easily seen by comparing a calibrated reference arm path of exactly 4 meters to one that has increased by 40 microns or 10 PPM. These values give a scaling value of 0.575000 and 0.57499425 MHz/m respectively. Thus, for an actual range differential of 10 meters, the drifted value will be 100 microns long.

This application discloses use of specially coated PM fiber to reduce the change in the optical path lengths in the reference arm. While polyimides have numerous uses in several fields, as a fiber optic coating it offers a reduced cross sectional area (low profile) that would also be heat resistant for high temperature applications such as medical sterilization and high curing temperatures of various laminates. It is also used for increased protection in hostile environments. The current application makes use of its water resistant nature (typically used only in textiles; see, e.g., Hope, Diane, "New Technologies for Fire Resistant Textiles and Membranes," Innovation, vol. 8, no. 5, September/October 2000) to eliminate the outgassing common in the acrylate coated fiber.

The embodiment will now be described in greater detail by reference to the following non-limiting examples. The following examples are intended to illustrate but not limit the embodiment.

EXAMPLES

During the production process, the 50/50 fiber optic couplers are fitted with output fibers coated in polyimide. When the reference arm is built, only fiber coated with polyimide is used, resulting in a reference arm whose drift will be minimized due to the absorption on or outgassing of the fiber jacket. The thin polyimide coating exhibits a marked improvement over the acrylate, resulting in an order of magnitude improvement over the old technology. The improved performance can be easily demonstrated by comparison with the calculation above. With the improved coating, the reference path increases by 4 microns, or 1 PPM. This gives scaling factors of 0.575000 and 0.574999425 MHz/m. At the 10-meter range, the drifted value is only 10 microns from the assumed value in comparison to 100 microns before, or an improvement of about a factor of 10 in precision over the conventionally coated fiber.

Figure 2:
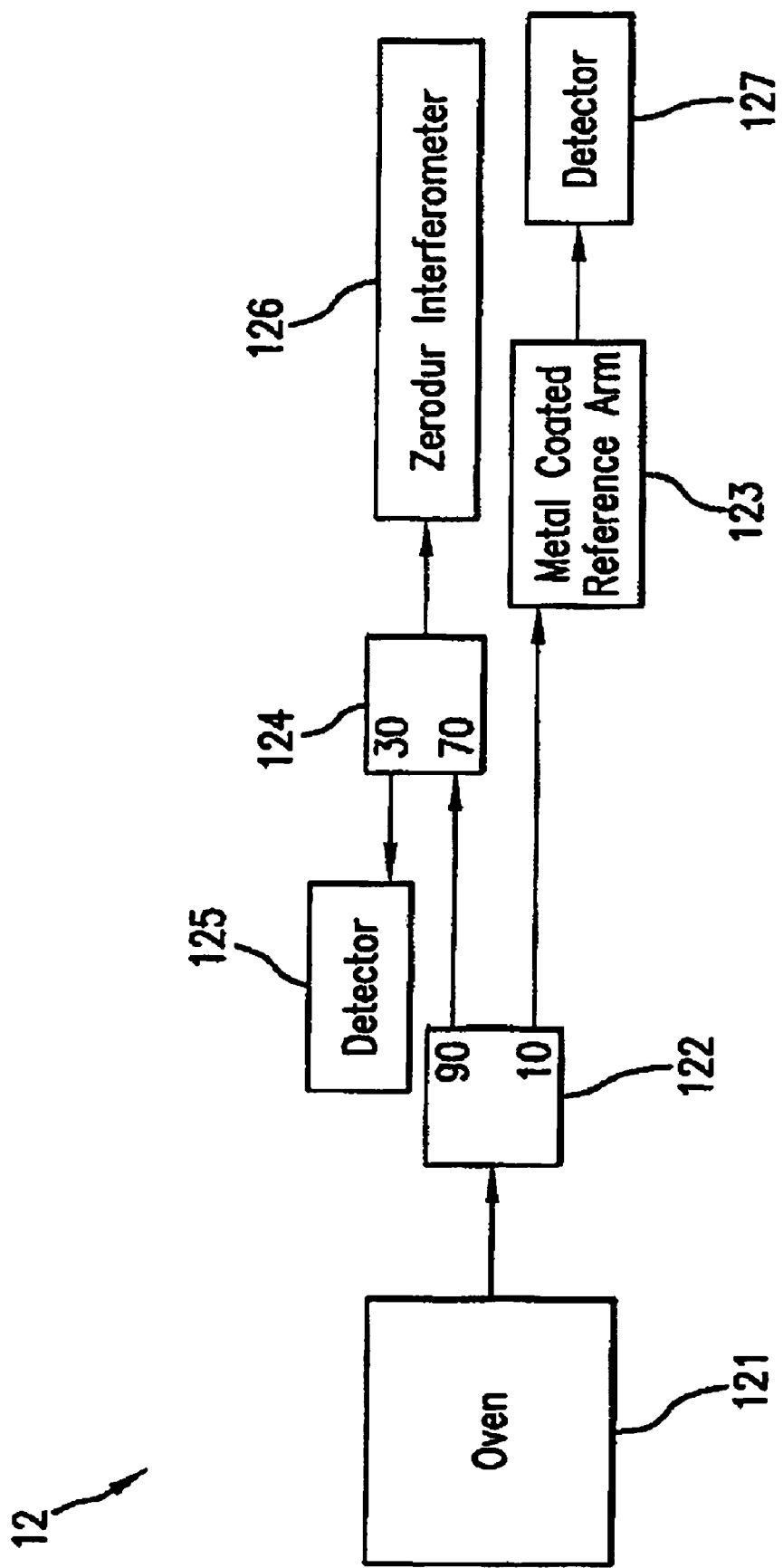
FIG. 2 shows a metal coated fiber test setup.

In order to test the relative range drift of an MV200™ (i.e., portable coherent laser radar system sold under the Trademark MV200™) reference arm built with different fiber optic coatings, a test setup was built in a temperature-controlled environment, 12, as shown in FIG. 2. Initially, the setup consisted of a current MV200™ oven, 121, used as a laser source feeding into a test oven that contained a standard reference arm. The fiber within the oven was coated as thoroughly as possible with low melting point metal, 123. The signal generated by the test oven was measured by the detector.

To monitor the range drift, light was split from the laser source using a 90/10 coupler, 122. This light was sent, via a 70/30 coupler, 124, to an open beam Michelson interferometer consisting of a fiber pigtail attached to a fiber mount and a lens that would send a collimated beam to a mirror and then a retroreflector, which would then return the beam back to the pigtail. Reflected light from the pigtail acted as the internal LO and mixed with the reflected light from the retroreflector to generate the radar signal which was measured by the detector, 125, via the coupler, 124.

The components were mounted on a length of ZERODUR® glass, a substance that exhibits minimal thermal expansion ($\pm 0.15 \times 10^{-6}$/degree C.). Many optical applications require a substrate material with a near-zero coefficient of thermal expansion and/or excellent thermal shock resistance. ZERODUR®, with its very small coefficient of thermal expansion at room temperature, is such a material. ZERODUR®, which belongs to the glass-ceramic composite class of materials, has both an amorphous (vitreous) component and a crystalline component. This Schott glass is subjected to special thermal cycling during manufacture so that approximately 75% of the vitreous material is converted to the crystalline quartz form. The crystals are typically only 50 nm in diameter, and ZERODUR® appears reasonably transparent to the eye because the refractive indices of the two phases are almost identical. However, scattering at the grain boundaries precludes the use of ZERODUR® for transmissive optics.

This formed an open-air path along the zerodur length that allows for a constant, unchanging range measurement. FIG. 2 shows complete layout 12. Thus, the drift in the test oven was measured by comparing the range measurement at the test oven detector, 127, to the range measured at the monitor detector, 125.

This setup was attached to standard MV200™ M signal processing electronics with scanner control flags disabled. The setup was powered on, linearized, and allowed to settle for about an hour. Data was collected over the course of a week by using the stare measurement dialog, and all data was corrected for range deviation due to environmental temperature and pressure changes.

Figure 3:
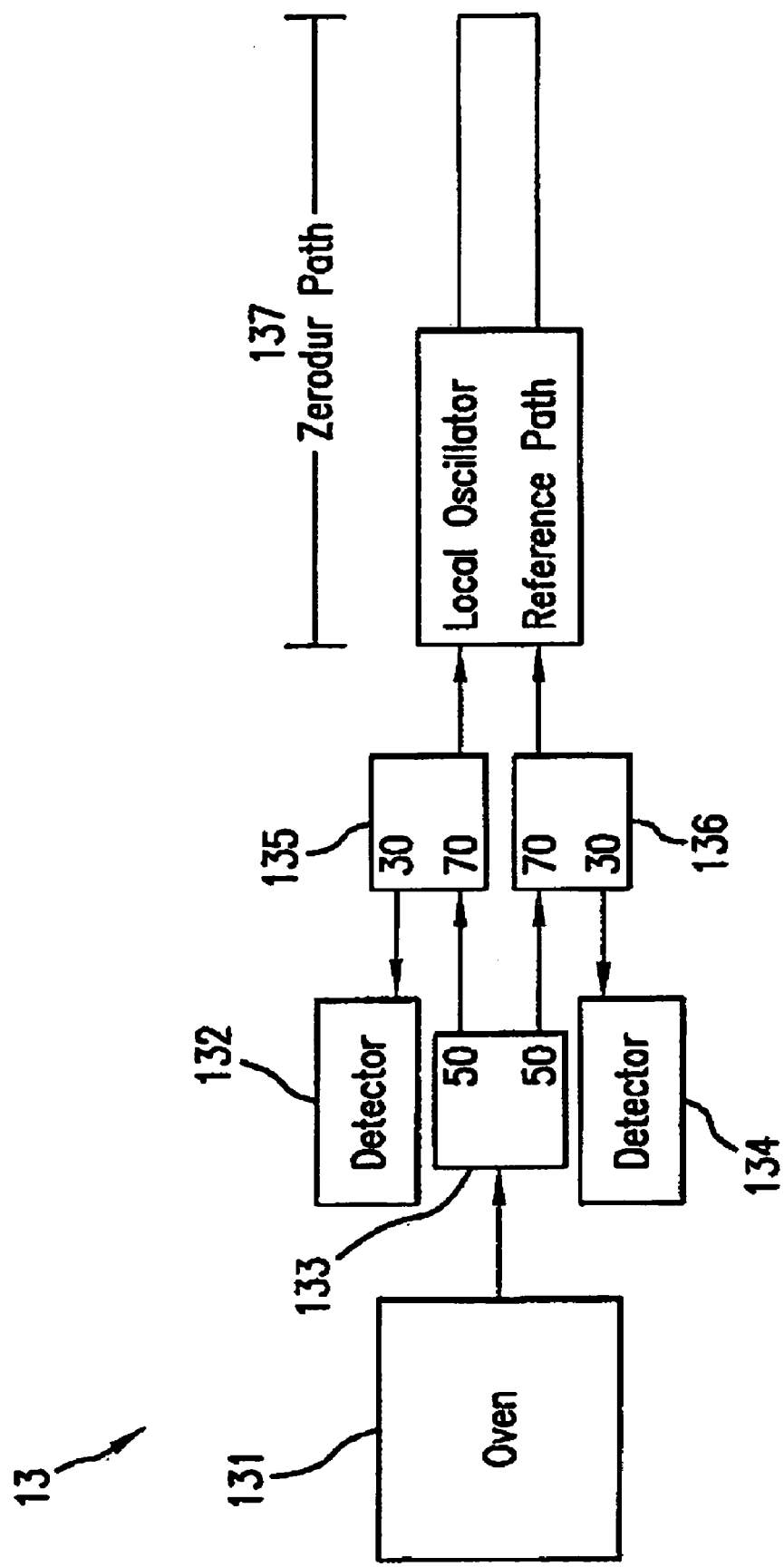
FIG. 3 shows a dual Zerodur test setup.

In order to test the stability of the zerodur path interferometer, the setup from FIG. 2 was altered such that the test oven was removed and a second zerodur path interferometer installed, 13, as shown in FIG. 3. One of these paths was used as a reference arm and the other was used as local oscillator one (LO1) and data was recorded over the course of a week. The light from the MV200™ oven, 131, passes through a 50/50 optic coupler, 133, thereby splitting the beam into two fibers. The split beams are sent via the 70/30 couplers 135 and 136, to the open air path Michelson interferometers, 137, as described above. The output of each interferometer is measured by the detectors, 132 and 134. By monitoring the output of the detectors, the intrinsic drift of the zerodur paths can be measured.

Figure 4:
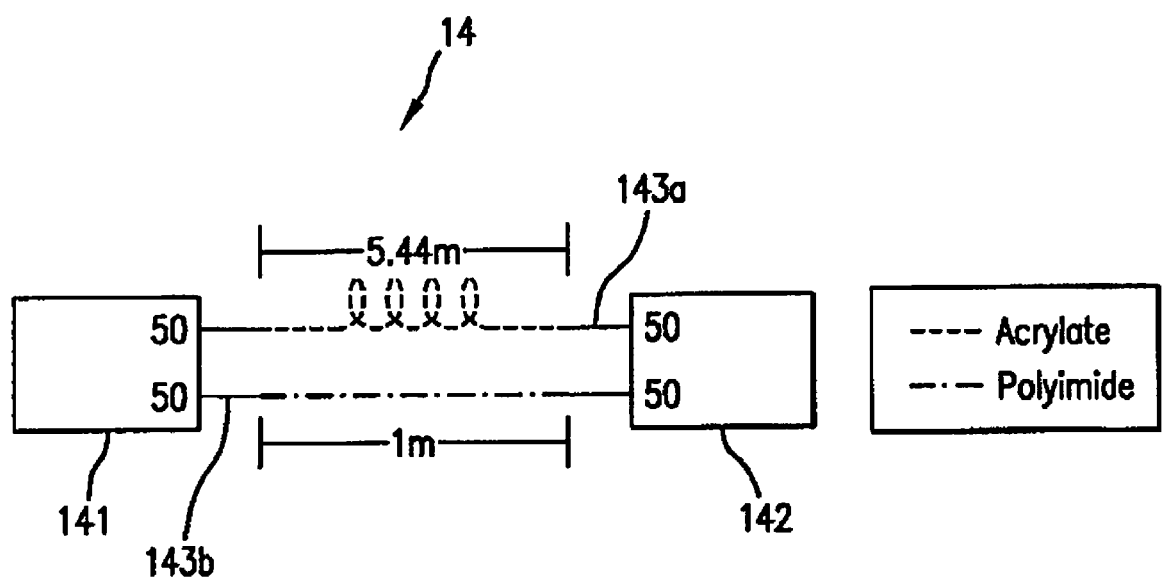
FIG. 4 shows a prototype polyimide reference arm.

Another test oven was then built with polyimide-coated fiber replacing the metal/acrylate coating, 14, FIG. 4. This was accomplished by cutting the internal leads of the 50/50 couplers, 141 and 142, as short as possible and replacing the bulk of the fiber with polyimide coated fiber (143b). Instead of exactly repeating the test done with the metal-coated fiber, both zerodur arms were used as LO1 and LO2 while the polyimide oven was used as the reference arm as shown in FIG. 5.

The light from the MV200™ oven, 151, passes through a 90/10 optic coupler, 152, splitting the beam into two fibers. A first fiber beam is passed through a 50/50 optic coupler, 153, thereby splitting the first beam into two separate fibers which are sent, via the 70/30 couplers, 154 and 155, to the open air path Michelson interferometers, 158, as described above. The output of each interferometer is measured by the detectors, 156 and 157.

The second beam is sent through a polyimide coated reference arm 160, which is mounted on a thermal electric cooler (TEC), 161, that is controlled by a TEC controller, 162. The beam is then sent to a detector, 159. Data was taken as before.

Figure 5:
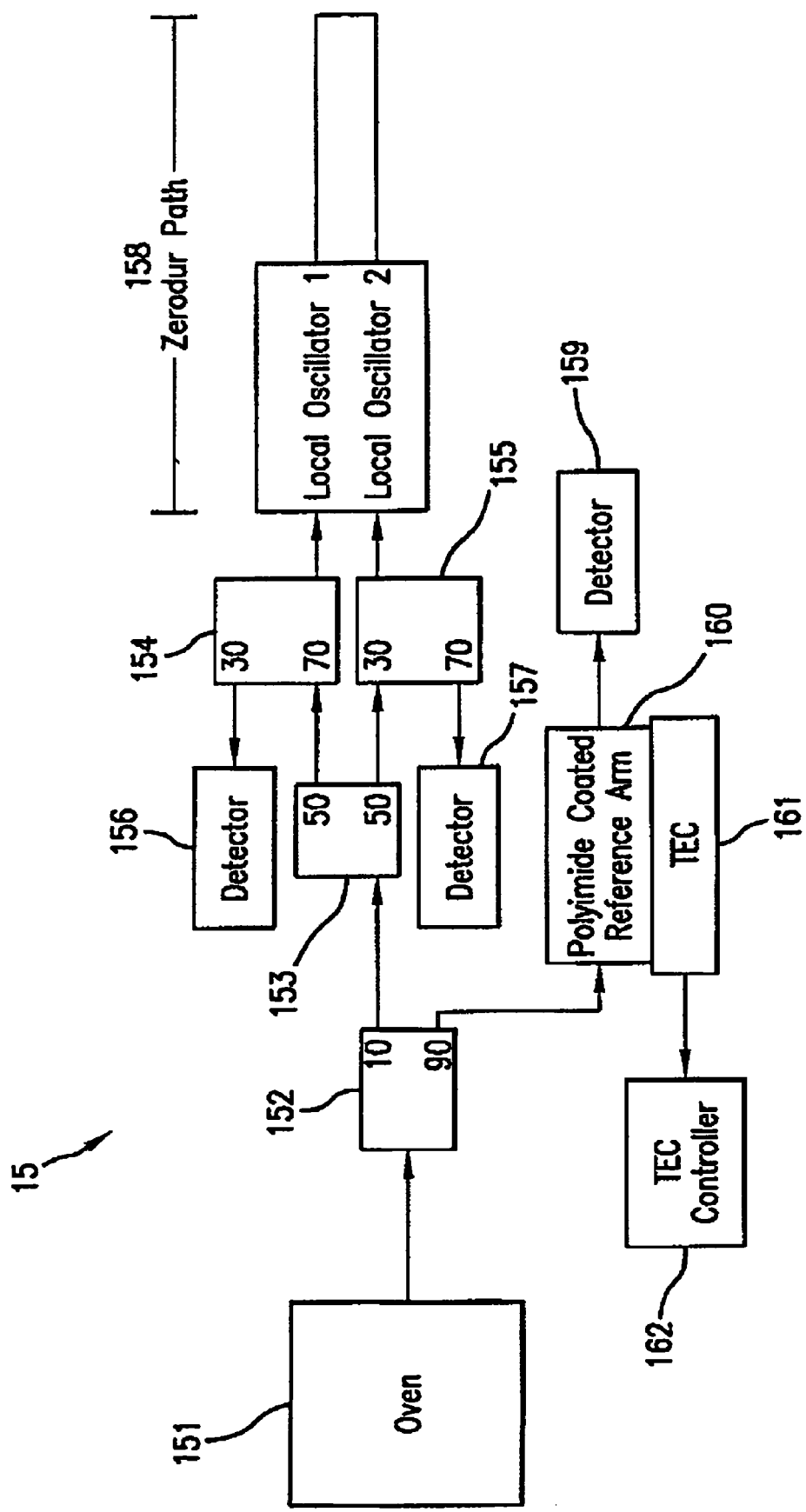
FIG. 5 show a polyimide coated reference arm with dual Zerodur LOs.

For the final test, the same set-up was used, but the standard MV200™ Oven number 6 was used as LO1 and one of the zerodur paths was used as LO2 (FIG. 5). This data was taken for three days.

The data were tabulated and the range was corrected for changes in the environment. The range spread was then calculated, as was the spread in PPM. These results are summarized in Table 1:

TABLE 1

| Test results from initial coatings testing | | | | | | |
|---|---|---|---|---|---|---|
| | Metal Coated fiber vs. Zerodur | Zerodur reference vs. Zerodur | (Set 3) Polyimide fiber vs. Zerodur LO1 | (Set 3) Polyimide fiber vs. Zerodur LO2 | (Set 4) Polyimide fiber vs. Oven 6 reference | (Set 4) Polyimide fiber vs. Zerodur |
| Range Spread in Microns | 52.9 | 11.7 | 15.2 | 18.6 | 69.5 | 18 |
| Range Spread in PPM | 27.3 | 5.0 | 7.1 | 8.7 | 19 | 7.9 |

It is clear that the polyimide coated fiber performed substantially better than that coated with acrylate. In fact, the polyimide fiber performed almost as well as zerodur compared to zerodur, suggesting that the drift within the polyimide reference could possibly be attributed to drift within the relatively short acrylate leads or to inherent instability of the open air setup.

At this point, 50/50 couplers were produced with polyimide leads to ensure that the critical lengths (i.e., where the reference path was split) would exhibit maximum stability. These couplers were used to fabricate a reference arm in a standard MV200™ oven and mounted in a system to be tested as a complete unit. This testing consisted of a standard Range Calibration and Verification followed by scanner performance testing under a variety of environmental conditions. The scanner was then subjected to another Range Verification. A second Range Calibration was performed if necessary.

Since the first polyimide reference arm performed well, several more were integrated into subsequent ovens. Table 2 summarizes the range drift performance of these ovens as compared with those of acrylate leads.

TABLE 2

| Acrylate and Polyimide Reference Arm range drift after environmental testing | | |
|---|---|---|
| | Acrylate | Polyimide |
| PPM change after testing | 15.5 | 1.08 |

Thus, what has been described is an improved jacketing/coating material that does not tend to adsorb water vapor or outgas impurities which can cause an effective change in the optical path length of elements of a reference arm. While the embodiment has been described in connection with what is presently considered to be the most practical and preferred embodiments, it is to be understood that the scope is not to be limited to the disclosed embodiments, but, on the contrary, is intended to encompass various modifications and equivalent arrangements included within the spirit and scope of the appended claims. The scope of the appended claims is to be accorded the broadest interpretation so as to encompass all such modifications and equivalent structures.

What is claimed is:

1. A measurement system comprising:
   two optical fibers, each optical fiber from said two optical fibers being coated with a substantially hydrophobic and substantially non-outgassing substance; one optical fiber from said two optical fibers having a length different from another optical fiber from said two optical fibers;

a first fiber optic coupler for
  receiving electromagnetic (EM) radiation; and
  splitting the EM radiation into a measurement path and a reference path;
said reference path including
  a second fiber optic coupler for
    receiving said EM radiation from the reference path; and
    splitting said EM radiation into each of said two optical fibers;
  a third fiber optic coupler for
    receiving EM radiation from said two optical fibers; and
    providing said received EM radiation to a single fiber; and
  a detector for
    calibrating, from said single fiber, a difference in length between said two optical fibers; and
    calculating a distance along said measurement path as a function of said difference in length, wherein said reference path is in a Mach-Zehnder configuration, and said substantially hydrophobic and substantially con-outgassing substance is selected from polyimide, ultraviolet cured acrylate, teflon, tefzel, hytrel, or nylon.

2. A method for rendering the measurement of distance along an electromagnetic (EM) radiation measurement path insensitive to temperature variations and environmental fluctuations comprising the steps of:
  coating two optical fibers, said two optical fibers disposed between a first fiber optic coupler and a second fiber optic coupler, with a substantially hydrophobic and substantially non-outgassing substance;
  receiving EM radiation into a third fiber optic coupler;
  splitting the received EM radiation into a measurement EM radiation and a reference EM radiation;
  receiving the reference EM radiation into the first fiber optic coupler;
  splitting, by the second fiber optic coupler, the received reference EM radiation into the two optical fibers;
  receiving the two optical fibers into the second fiber optic coupler;
  combining, by the second fiber coupler, combined EM radiation received from the two optical fibers and providing the combined EM radiation to a single fiber;
  calibrating, from the combined EM radiation, a difference in length of between the two optical fibers; and
  calculating a distance of the measurement EM radiation as a function of the difference in Length, wherein said reference path is in a Mach-Zehnder configuration, and said substantially hydrophobic and substantially con-outgassing substance is selected from polyimide, ultraviolet cured acrylate, teflon, tefzel, hytrel, or nylon.

* * * * *